United States Patent Office 3,679,479

Patented July 25, 1972

3,679,479

WASHOUT-PRESERVATIVE FOR LITHOGRAPHIC PRINTING PLATES

Donald A. Ray and Richard E. Arnold, Rochester, N.Y., assignors to Eastman Kodak Company, Rochester, N.Y.

No Drawing. Filed Jan. 7, 1970, Ser. No. 1,285
Int. Cl. B08b *3/08;* C23g *5/02*
U.S. Cl. 134—40 8 Claims

ABSTRACT OF THE DISCLOSURE

A washout-preservative for removing a full charge of ink from a lithographic printing plate and conditioning and protecting the printing plate during holdover between press runs of from several hours to several weeks comprises a hydrophilic colloid desensitizer, an ink solvent, and an image conditioner. The compositions can contain surfactants and other addenda.

This invention relates to lithography. In a particular aspect it relates to a washout-preservative formulation for presensitized lithographic printing plates which will clean a used lithographic plate and condition and preserve it for holdover between press runs.

In recent years there has been a rapid increase in the used of light-sensitive polymers and polymer compositions in the preparation of lithographic printing plates. A layer of the polymer composition is formed on a suitable lithographic support and is imagewise exposed to actinic radiation to effect a solubility difference between the exposed and unexposed areas of the layer. A polymeric image is developed by treatment with an appropriate solvent which is a solvent for the material in only the exposed or unexposed areas, but is a non-solvent for material in complementary areas. The action of the developer solvent uncovers the substrate, and by appropriate selection of the polymer composition and support, or by appropriate after-treatment, there is obtained a lithographic printing plate having oleophilic image areas on a hydrophilic background.

Once a lithographic plate is prepared for the press, it is generally used until the printing job is finished. In many instances, however, holdovers are necessary. Normally for holdovers of up to 30 to 40 minutes, treatment of the plate is not necessary. For holdover periods of one hour or longer, or when fast drying inks are used various techniques are employed to insure problem-free re-starts. These include such steps as removal of the ink from the plate, application of a desensitizing gum on the surface of the plate, application of a greasy, non-hardening material such, as asphaltum, to the surface of the plate, etc. Various of these steps can be employed in different orders depending upon the particular technique which is being employed and the degree of protection desired for the plate.

There are various difficulties which can arise using these techniques. Desensitization of the image areas due to "gum blinding" can occur; the asphaltum may be very difficult to remove from the non-image areas after storage; or with some plates the dissolved ink can be forced into the grained surface and dry on the plate before it can be removed. In many instances the problems that are encountered are a result of improper or poor technique. If the gum is not thoroughly dry, the asphaltum will penetrate the gum and create scum (i.e., non-image areas which accept ink) on the plate. In many cases conventional inks and the quick-set inks containing driers, are left on the plate for hours permitting them to harden and making them difficult to remove.

It is an object of this invention to provide a novel single formulation to remove ink from a lithographic printing plate and to condition and preserve the plate for holdover between press runs.

It is another object of this invention to provide a formulation that will remove ink from an entire lithographic printing plate, desensitize the non-image areas of the plate, and condition the image areas in order that those areas will retain their ink receptivity, so that the plate can be stored for several weeks without an adverse effect on its printing quality.

It is still another object of this invention to provide a formulation which will reduce the time needed to clean and protect a lithographic printing plate during short periods of holdover.

It is yet another object of this invention to provide a process for cleaning, conditioning and protecting a lithographic printing plate during holdover.

The above and other objects of this invention will become apparent to those skilled in the art from the further description of this invention which follows.

In accordance with the present invention there is provided a combined washout-preservative composition which reduces the time and effort needed to adequately clean and protect a lithographic printing plate for holdover of periods varying from several minutes to several weeks, and at the same time reduces the problems related to technique. The washout-preservatives of the present invention comprise a hydrophilic colloid desensitizer, an ink solvent, and an image conditioner. The ink solvent dissolves greasy lithographic ink and removes it from the surface of the plate, the hydrophilic colloid desensitizer preserves the hydrophilic properties of the non-image areas of the printing plate and prevents them from becoming non-hydrophilic, while the image conditioner is a greasy material which improves the inking characteristics of the image areas of the plate and keeps the formulation from hardening with age and thereby permits easy removal of the formulation after holdover. Other addenda, as will be described more fully hereinafter, are incorporated in preferred embodiments of the present invention to accompish a variety of purposes.

The washout-perservative formulations of the present invention can be used with lithographic printing plates in general and are particularly useful with lithographic printing plates prepared with light-sensitive polymeric compositions.

In practice, an amount of the washout-preservative formulation of the present invention is swabbed on the inked printing plate and smoothed over the surface of the plate after which the plate can be stored for periods up to several weeks. Although a single application of the washout-preservative is sufficient for most purposes, if it is desired that the ink be removed from the plate before storage, the first application of the washout-preservative can be cleaned from the plate and a second application made. When the plate is ready for re-use, the washout-preservative formulation is removed from the surface of the plate with a suitable solvent, including water, and the plate can be used for printing after such appropriate treatment as desensitization and the like.

The hydrophilic colloid desensitizers which can be used in the present invention are those which are generally employed in desensitizing formulations. They are water-soluble gums which contain carboxyl and hydroxyl groups. Gum arabic is the oldest and best known of the useful hydrophilic colloid desensitizers and is preferred for use in the present formulations. Carboxymethyl cellulose, also known as cellulose gum, is widely used, although it is not as good a desensitizer on aluminum plates as is gum arabic. Another derivative of cellulose which can be used is hydroxyethyl cellulose. Synthetic hydrophilic colloids, such as styrene-maleic anhydride copolymers, polyvinyl pyrrolidone, and the like also can be used in the formulations of the present invention. A typically useful range of colloid concentration is between about 1 and 20 percent by weight.

It has been found that if the hydrophilic colloid desensitizer is acidified there is better adhesion of the hydrophilic colloid to the substrate in non-printing areas of the plate. It is generally believed that this is due to the carboxylic acid groups on the hydrophilic colloid being in their free acid form, in which form they are more strongly adsorbed to a metallic substrate. Thus, in conjunction with the hydrophilic colloid desensitizer, the formulation contains an acid. Phosphoric acid is a preferred acid for use in acidifying the formulation. Other acids which can be used include inorganic as well as organic acids, such as acetic acid. A buffering agent, such as ammonium acetate can also be included. Preferably formulations of the present invention are maintained at a pH in the range of 2 to 6.

Other additives which can be used in conjunction with the hydrophilic colloid desensitizers include surfactants and wetting agents which improve the contact between the formulation and the hydrophilic substrate. Suitable wetting agents include polyhydric alcohols such as glycerine, pentaerythritol, ditheylene glycol, triethylene glycol, oligomeric poly(ethylene glycols), etc.; esters of inorganic acids such as phosphate esters of such akanols as n-hexanol, n-octanol, n-decanol, etc., phosphate esters of such alkoxyalaknols as 2 - n - octyloxyethanol, 2-n-decyloxyethanol, etc., mixtures of such phosphate esters, etc.; esters of organic acids such as the dioctyl ester of sodium sulfosuccinic acid; polymerized organic salts of sulfonic acids of the alkyl-aryl and aryl-alkyl type, polyethers such as octyl phenoxy polyethoxy-ethanol, ethylene oxide polymers, nonyl phenyl polyethylene glycol ether, etc.; and the like; as well as commercially available materials sold under such trademarks as "Zonyl A," "Triton X–35," "Triton X–45," "Triton X–100," "Surfynol 450," "Aerosol OT," "Tergitol 15," "Ahcowet ANS," etc. The amount of these materials added to the composition will of course depend upon the particular agent employed and its characteristics. Typically they can be employed in amounts of about from 0.1 to 5 percent by volume.

The ink solvent which is used in the washout-preservative formulations of the present invention can be any solvent employed in the art to remove greasy ink from lithographic plates, so long as it is compatible with the other components of the formulation. Suitable solvents include hydrocarbon solvents, such as petroleum distillates, e.g., naphtha, Stoddard solvent, etc.; mineral spirits; cyclic hydrocarbons such as benzene, xylene, etc.; turpentine; and the like. In conjunction with the ink solvent there is generally employed an alkanol such as butanol, isopropanol, or the like. This alkanol can constitute from 5 percent to 50 percent by volume of the ink solvent.

The image conditioner employed in the formulation of the present invention adheres to the image areas of the printing plate and keeps these areas oleophilic, thus preventing the desensitizer from adhering to the areas and causing gum blinding. The image conditioner also prevents the formulation from hardening while on the plate, thus permitting easy removal of the formulation from the plate when ready to be re-used. Suitable image conditioners include resinous materials, such as hydrogenated rosin esters, colophony, etc., non-resinous organic esters such as methyl abietate, etc., and the like, as well as mixtures of such materials. The image conditioner can comprise from 2 to 6 percent by volume of the composition.

In preparing the formulations of the present invention generally the ink solvents and the image conditioner which is soluble therein, are mixed together and then mixed with a composition prepared from the hydrophilic colloid desensitizer and the components used in conjunction therewith. Since the hydrophilic colloid desensitizer is not soluble in the ink solvent, generally good mixing is obtained by forming an emulsion of the hydrophilic colloid desensitizer and the ink solvent composition. This is accomplished by employing an emulsifier which can be one of the wetting agents or surfactants referred to above.

The compositions of the present invention are particularly useful with lithographic printing plates having coatings of such light-sensitive polymers as polyesters, polycarbonates and polysulfonates which contain the light-sensitive grouping $$—CH{=}CH—\overset{\displaystyle O}{\overset{\|}{C}}—$$

as an integral part of the polymer backbone. Polymers containing this light-sensitive grouping are described in U.S. Pats. 3,030,208 and 3,453,237, and U.S. application Ser. No. 709,496, filed Feb 29, 1968 The polyesters can be prepared by condensing a suitable polycarboxylic acid, or the lower alkyl ester or chloride of a suitable polycarboxylic acid with a suitable polyhydric alcohol, in the presence of an esterification catalyst The polycarbonates can be prepared by reaction of one or more polyhydric alcohols with phosgene, or by reaction of a bischloroformate of a polyhydric alcohol with another polyhydric alcohol. The light-sensitive grouping can be contained either in the polycarboxylic acid or in the polyhydric alcohol. Typical polycarboxylic acids include p-phenylene diacrylic acid, fumaric acid, succinic acid, adipic acid, terephthalic acid, etc., and mixtures of these acids. Typical polyhydric alcohols include ethylene glycol, 1,3-propane diol, 1,6-hexane diol, neopentyl glycol, 1,4-cyclohexanedimethanol, 1,4 - di-β-hydroxyethoxycyclohexane, diphenylol propane, tetrachlorodiphenylolpropane, dihydroxy chalcones and dihydroxy dibenzal ketones such as divanillal cyclopentanone, 4,4′ - dihydroxychalcone, etc., as well as mixtures of these diols.

Other printing plates with which the formulations of the present invention are particularly useful are those prepared from a light-sensitive coating of a suitably stabilized water-soluble resin containing the diazonium group. Such printing plates are described in U.S. Pat. 3,342,601.

The above light-sensitive polymers are negative working, that is coatings of these polymers harden or become more insoluble in areas exposed to actinic radiation, thus giving a negative polymeric image of the image through which they are exposed. The formulations of the present invention can also be used with lithographic printing plates derived from positive-working polymers. Typical of lithographic printing plates employing positive-working polymers are those described in U.S. application Ser. No. 684,636, filed Nov. 21, 1967, which have attached to a polymeric moiety the following light-sensitive units:

$$—\overset{\displaystyle R}{\overset{|}{N}}—X—D$$

where R is a hydrogen atom or a lower alkyl group, e.g., an alkyl group having 1–4 carbon atoms, X represents a sulfonyl (—$SO_2$—), carbonyl (—CO—), carbonyloxy $$(—\overset{\displaystyle O}{\overset{\|}{C}}O—)$$

sulfinyloxy $$(—\overset{\displaystyle O}{\overset{\|}{S}}O—)$$

or the like group and D represents a quinone diazide group. Polymers to which these units can be attached include homo or copolymers containing a reactive nitrogen atom and can be either condensation or addition polymers. Suitable addition polymers are those containing a reactive nitrogen and include aminostyrenes, polyvinyl amines, polyaminoalkyl acrylamides, aniline substituted polyacrylic acid amides, polyvinyl anthranilates as well as amino containing heterocycic nuclei polymers such as polymeric amino triazoles. Suitable condensation type polymers having a free reactive nitrogen include aniline formaldehyde type polymers wherein aniline and formaldehyde are condensed under strong acid conditions as described on p. 280 of Golding, "Polymers and Resins," D. Van Nostrand, New York, 1959. Coating compositions generally combine at least one of these positive-working light-sensitive polymers with a different film-forming resin, such as phenol-aldehyde resin of the Novolac or resole type, e.g., phenol-formaldehyde and cresol-formaldehyde resins. Other positive-working lithographic printing plates are described in U.S. application Ser. Nos. 621,469, filed Mar. 8, 1967, and 857,587, filed Sept. 12, 1969.

Supports on which a layer of the light-sensitive polymer is coated to prepare lithographic printing plates can be selected from any of the standard lithographic supports and include sheets and plates of such metals as aluminum, anodized aluminum, copper, zinc, etc., paper, polymeric coated paper, synthetic resins, and the like. The support is often subbed with a coating which improves adhesion of the light-sensitive polymer and increases the hydrophilic properties of the background areas of the printing plate. Particularly useful supports are the aluminum supports described in U.S. Pat. 3,342,601 and U.S. application Ser. No 567,031, filed July 1, 1966

The following examples further illustrate this invention.

EXAMPLE 1

Preparation of a washout-preservative

Compositions A and B are prepared having the following formulation.

Composition A:

| | | |
|---|---|---|
| 10° Baumé gum arabic | gm | 5.0 |
| Modified ethylene oxide surfactant (Zonyl A sold by Du Pont) | gm | 1.25 |
| Phosphoric acid | cc | 10.0 |
| Ammonium acetate | cc | 4.0 |
| Glycerine | cc | 40.0 |

Composition B:

| | | |
|---|---|---|
| Isopropyl alcohol | cc | 50.0 |
| Hydrogenated rosin (Staybelite Resin sold by Hercules Powder Co.) | gm | 1.0 |
| Methyl abietate | cc | 15.0 |
| Petroleum distillate (Stoddard solvent) | cc | 500 |

Compositions A and B are combined in a 3:1 ratio by mixing 750 cc. of Composition A with 250 cc. of Composition B and then adding 6 cc. of a sodium alkyl aryl sulfonate wetting agent, Ahcowet ANS sold by ICI/Organics/Inc. Upon shaking a stable emulsion is formed.

EXAMPLE 2

Use of the washout-preservative

An anodized aluminum plate is whirl coated with a light sensitive polymer composition having the following formulation:

| | | |
|---|---|---|
| Light-sensitive polyester prepared by condensing 100 mole percent p-phenylenediethoxyacrylate with 100 mole percent 1,4-di-$\beta$-hydroxyethoxy-cyclohexane | g | 4.0 |
| (2 - benzoylmethylene) - 1 - methyl - $\beta$ - naphtho thiazoline | g | 0.32 |
| Benzoic acid | g | 0.16 |
| Hydroquinone | g | 0.08 |
| Monochlorobenzene | ml | 100.0 |
| Pigment (Heliogen Blue K, C.I. Pigment Blue 15) | g | 0.8 |

The plate is dried, exposed to insolubilizing radiation through a negative image transparency and developed by swabbing with the following developer composition:

| | | |
|---|---|---|
| 4-butyrolactone | ml | 500.0 |
| Triethanolamine | ml | 50.0 |
| Glycerol | ml | 50.0 |
| Methyl abietate | ml | 5.0 |
| Hydrogenated wood rosin (Staybelite Resin, Hercules Powder Co.) | g | 0.5 |
| Wetting agent (Zonyl A, a modified aliphatic ethylene oxide condensate sold by Du Pont) | ml | 4.5 |

The plate is cleanly developed by swabbing action and is treated with a desensitizing formulation containing gum arabic after which it is run on a press for 2000 impressions. The plate is removed from the press with a full charge of ink remaining on the plate. A five-inch pool of the washout-preservative formulation of Example 1 is applied to the surface of the plate and spread over the entire plate with a cotton pad until the ink is removed from the image areas. A second clean cotton pad is used to smooth down excess material. The non-image areas has a grayish cast resulting from the mixture of dissolved ink and the washout-preservative. When a second application is used, the background area is clean. However, in both cases there is no problem in restarting plates which have been so treated, even after storage for up to eight weeks.

The invention has been described in detail with particular reference to preferred embodiments thereof, but it will be understood that variations and modifiications can be effected within the spirit and scope of the invention.

What is claimed is:

1. A process for cleaning an inked lithographic printing plate and protecting the plate during holdover between press runs which comprises the steps of:

(1) applying to the plate a washout-preservative composition comprising a water-soluble gum desensitizer, a petroleum distillate ink solvent and an image conditioner which is a mixture of a hydrogenated rosin ester and methyl abietate, (2) spreading the composition on the plate to remove ink from contact with the surface of the plate, and (3) maintaining the composition on the plate until the plate is to be reused, at which time the composition is removed.

2. A process as defined in claim 1 wherein the washout-preservative composition further comprises a surfactant.

3. A process as defined in claim 1 wherein the washout-preservative composition is acidified to a pH of 2 to 6 with phosphoric acid.

4. A process for cleaning an inked lithographic printing plate and protecting the plate during holdover between press runs which comprises the steps of:

(1) applying to the plates a washout-preservative composition comprising gum arabic as a gum desensitizer, a mixture of Stoddard's solvent and isopropyl alcohol as an ink solvent, a mixture of methyl abietate and a hydrogenated rosin ester as an image conditioner, a sodium alkyl aryl sulfonate surfactant and sufficient phosphoric acid to adjust the pH of the composition to within the range of 2 to 6.

(2) spreading the composition on the plate to remove ink from contact with the surface of the plate, and (3) maintaining the composition on the plate until the plate is to be reused, at which time the composition is removed.

5. A process for cleaning an inked lithographic printing plate and protecting the plate during holdover between press runs which comprises the steps of:

(1) applying to the plate a washout-preservative composition comprising a water-soluble gum desensitizer, a petroleum distillate ink solvent and an image conditioner which is a mixture of a hydrogenated rosin ester and methyl abietate, (2) spreading the composition on the plate to remove ink from contact with the surface of the plate,
(3) removing the composition from the plate,
(4) making a second application of the washout-preservative composition to the plate, and
(5) maintaining the composition on the plate until it is to be reused, at which time it is removed.

6. A process as defined in claim 5 wherein the washout-preservative composition further comprises a surfactant.

7. A process as defined in claim 5 wherein the washout-preservative composition is acidified to a pH of 2 to 6 with phosphoric acid.

8. A process as defined in claim 5 wherein the washout-preservative composition comprises gum arabic as a gum desensitizer, a mixture of Stoddard's solvent and isopropyl alcohol as an ink solvent, a mixture of methyl abietate and a hydrogenated rosin ester as an image conditioner, a sodium alkyl aryl sulfonate surfactant and sufficient phosphoric acid to adjust the pH of the composition to within the range of 2 to 6.

References Cited

UNITED STATES PATENTS

| | | | |
|---|---|---|---|
| 2,780,168 | 2/1957 | Nichols | 134—40 UX |
| 1,406,183 | 2/1922 | Ghegan | 101—466 |
| 1,911,239 | 5/1933 | Reed et al. | 101—466 |
| 3,053,178 | 9/1962 | Greubel | 101—451 |
| 3,060,848 | 10/1962 | Beutner | 101—466 |

MORRIS O. WOLK, Primary Examiner

J. T. ZATARGA, Assistant Examiner

U.S. Cl. X.R.

101—466; 134—26; 252—143, DIG. 017